April 2, 1935.    A. J. SWEET    1,996,597
INDOOR LIGHTING UNIT
Filed Aug. 26, 1932    4 Sheets-Sheet 1

INVENTOR
A. J. SWEET
BY
ATTORNEY

April 2, 1935. A. J. SWEET 1,996,597
INDOOR LIGHTING UNIT
Filed Aug. 26, 1932   4 Sheets-Sheet 2
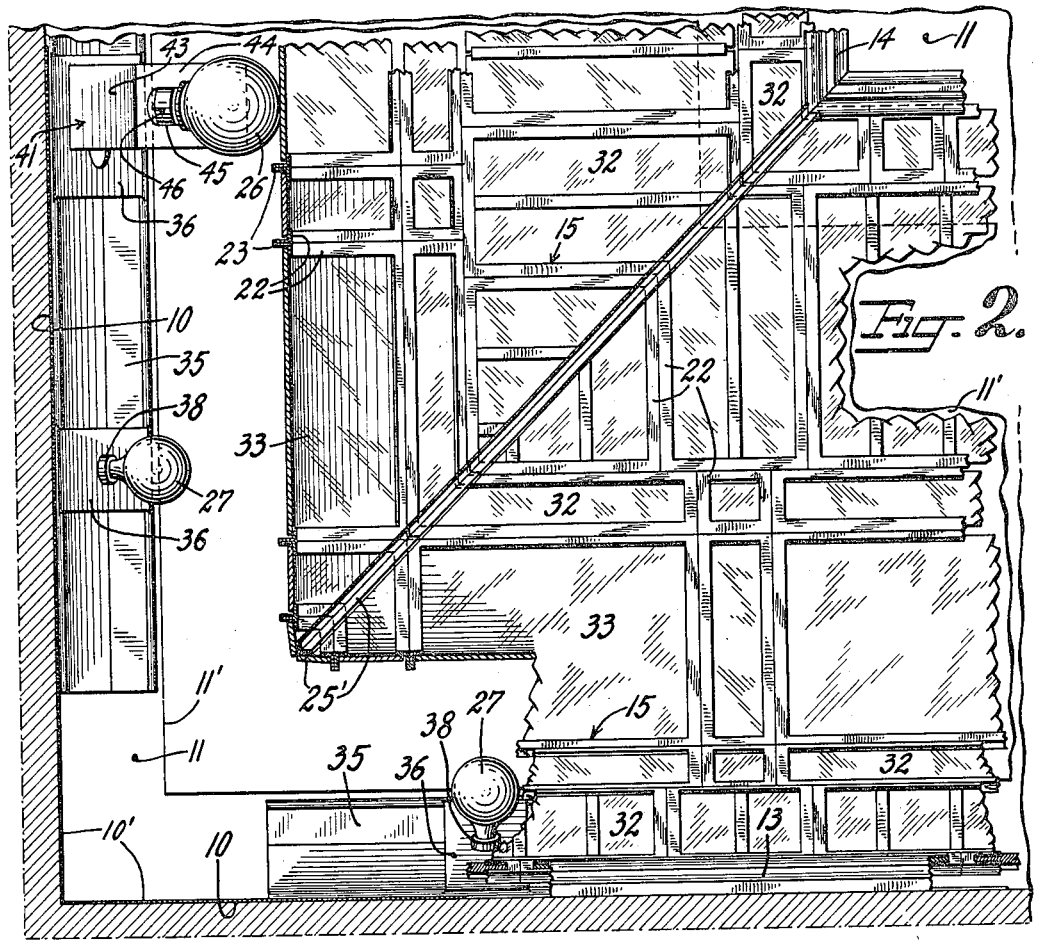
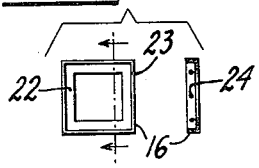
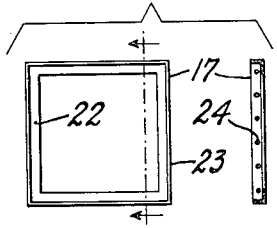
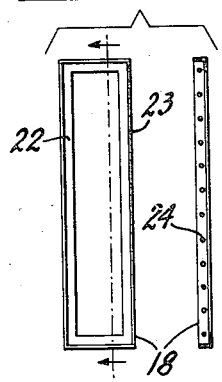
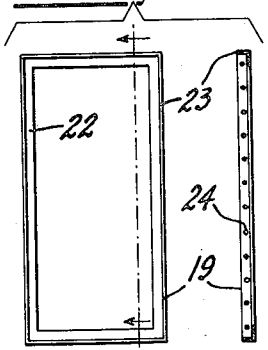
INVENTOR
A. J. SWEET
BY
ATTORNEY April 2, 1935.   A. J. SWEET   1,996,597
INDOOR LIGHTING UNIT
Filed Aug. 26, 1932   4 Sheets-Sheet 3
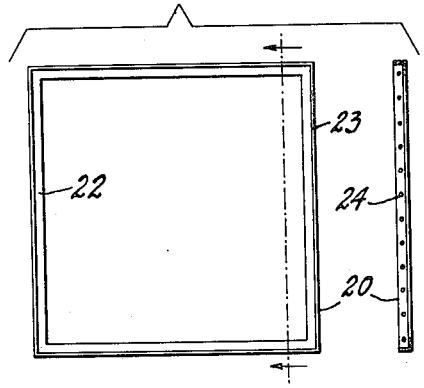
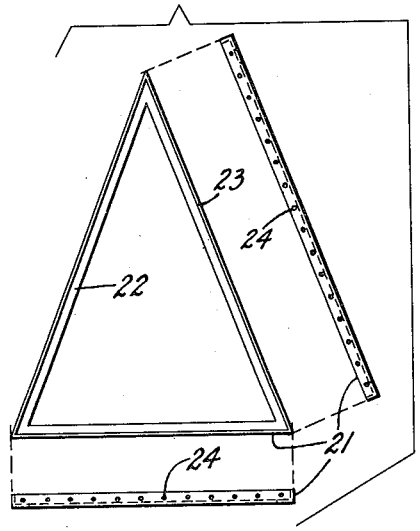
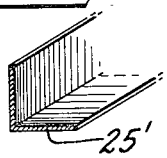
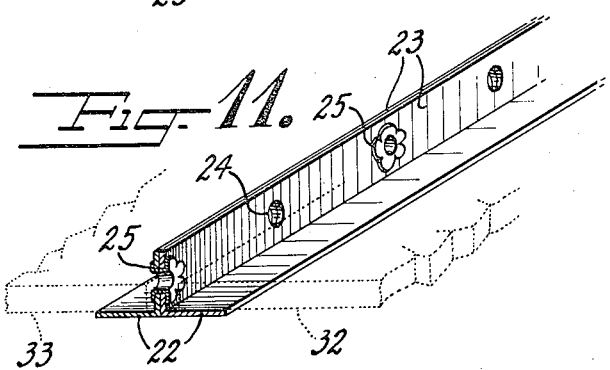
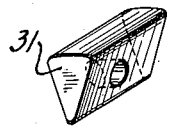
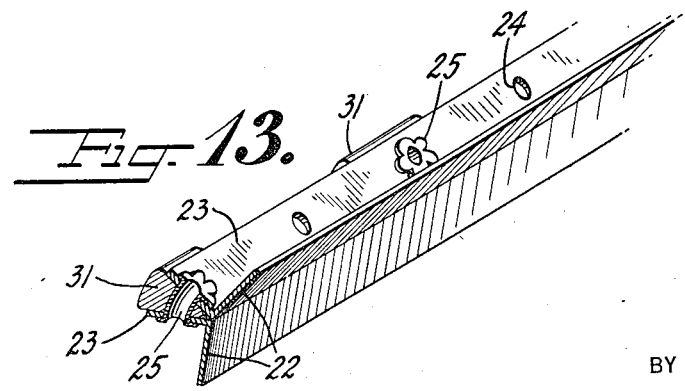
INVENTOR
A. J. SWEET
BY
ATTORNEY April 2, 1935.   A. J. SWEET   1,996,597
INDOOR LIGHTING UNIT
Filed Aug. 26, 1932   4 Sheets-Sheet 4
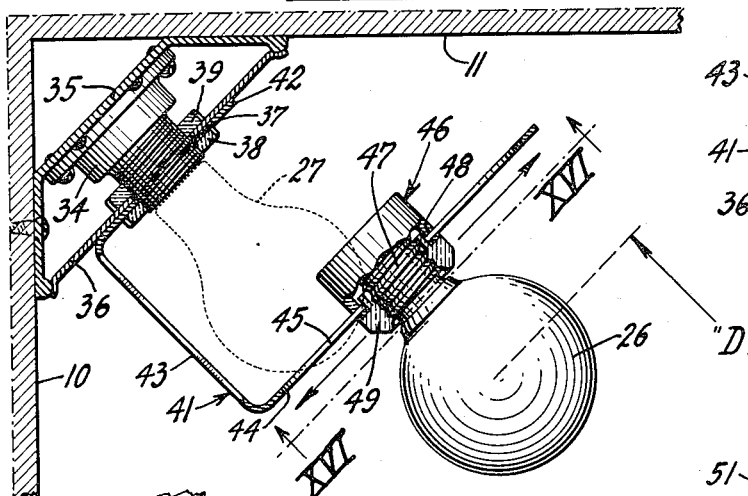
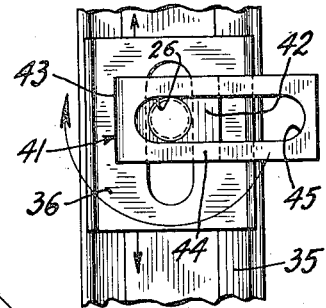
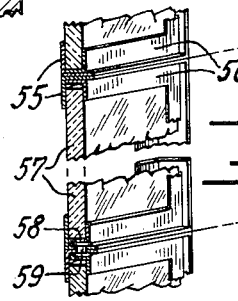
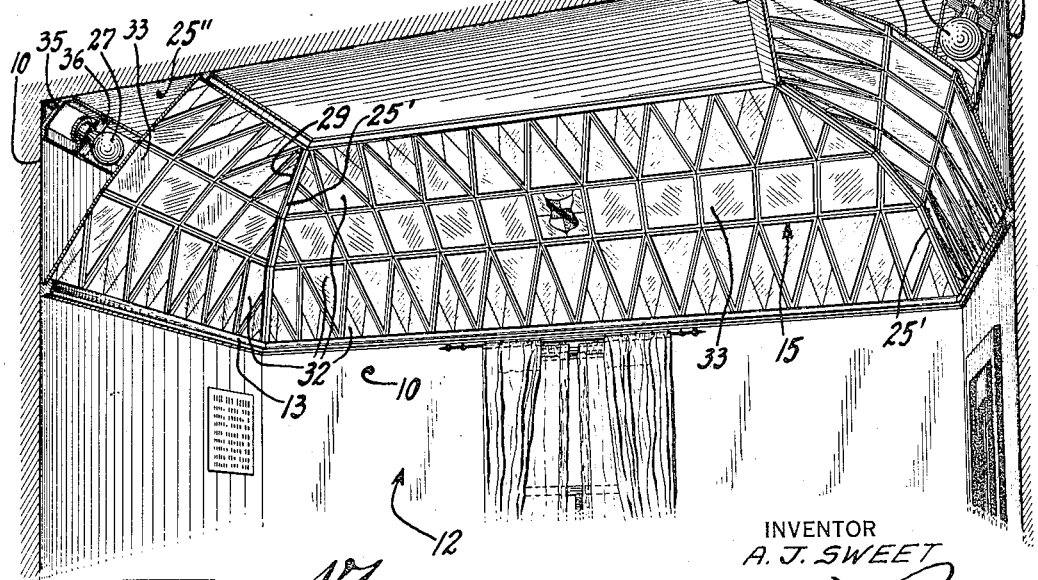
INVENTOR
A. J. SWEET
BY
ATTORNEY Patented Apr. 2, 1935

1,996,597

UNITED STATES PATENT OFFICE 1,996,597

INDOOR LIGHTING UNIT

Arthur J. Sweet, West Caldwell, N. J., assignor to Westinghouse Lamp Company, a corporation of Pennsylvania Application August 26, 1932, Serial No. 630,503

9 Claims. (Cl. 240—9)

This invention relates to artificial lighting and relates more particularly to lighting fixtures or equipment adapted to being built into an interior of a building so as to constitute a luminous architectural element rather than an element associated purely with a lighting function and having no architectural significance divorced from that function. An important feature of my invention lies in providing a plurality of standard parts which can be variously assembled to produce a great diversity of architectural and decorative effects and, simultaneously, to fit an interior of whatever dimensions as an architectural element of such interior.

In many types of interior, the pleasing character of the interior, as likewise its practical utility, would be enhanced if lighting fixtures of the heretofore conventional type could be eliminated and the lighting service derived from luminous elements of the walls or ceiling. Such treatment especially lends itself to the employment of relatively large light sources of low brilliancy, thus promoting hygienic conditions for vision. It likewise lends itself to more exact control in the intensity of illumination and in the direction from which the light is received on the work at each and all positions in the room. The artificial skylight is the best-known form in which this general type of lighting has been employed in the past.

The public has heretofore been prevented from enjoying the æsthetic, hygienic and utilitarian advantages of the skylight type of lighting by certain practical difficulties in securing a satisfactory installation. In accordance with the present invention, a lighting system having a luminous element as a wall or ceiling is made up of a large number of pieces which may be alike for appearance effects, for convenient access to the lamps, for convenient cleaning and to avoid dangerously large glass elements. These separate pieces may typically comprise an orderly arrangement and repetition of a few standard shapes and sizes. It is of advantage, for practical reasons, that each of these like parts shall be sufficiently close in dimensions to be interchangeable. Where, as in past practice, the mechanical elements which separate the glass walls have been especially built for a particular installation, great difficulty has been experienced in maintaining dimensions to such exactness as to make similar parts interchangeable. Moreover, the assembly of each separate installation as an individual thing has involved excessive cost. For these practical reasons, the architect or designer has been loth to employ this type of lighting save for installations where the spectacular and advertising advantages justified the time and labor involved.

An object of my invention is to provide a standard, factory-built product of substantially perfect uniformity whose assembly is so simple and so non-subject to variations introduced by the individual workman that these practical difficulties are avoided and this useful type of lighting is thereby free from the practical limitations which have prevented its application to the public good.

Another object of the present invention, is to provide a glazed element of wall or ceiling made up from a plurality of standard parts, all individuals of each style of such parts being of substantially identical dimensions; these parts being of such character that they can be easily and inexpensively assembled to produce any of a wide diversity of architectural designs and to fit any of a wide diversity of interior proportions and dimensions; and in combination with such glazed element, light sources of a character to be conveniently and inexpensively mounted in such spacial relationship to the glazed element as to produce a correct relationship in light distribution.

Another object of my invention is to provide a glazed element which in general provides a diffuse emission of light but which, by the substitution of prismatic or lens glassware for the diffusing glassware at substantially any point in the element, can be made to provide a parallel or nearly parallel beam of light directed toward the work or object of vision from the desired direction.

Another object of my invention is to provide a glazed element of wall or ceiling whose glass parts, while securely supported against accidental or chance displacement, are easily removable for access to the light source or for cleaning.

These and other objects and advantages of the invention will be more clearly understood from the following description, together with the accompanying drawings in which:

Fig. 1 is a fragmentary view of a glazed architectural element and its associated light source constructed in accordance with the present invention, the structure shown consisting of a glazed cove installed along the junction between wall and ceiling. This view shows, in its upper left corner, the preferred way of mounting the light source employed for providing the diffused general light emission and, in a plane nearer the beholder, the preferred way of mounting the light source employed for providing a beam of light specifically directed toward some object of vision.

Fig. 2 is a view taken on line II—II of Fig. 1;

Fig. 4 is a front and a sectional view of one of the small-size rectangular frames for holding the light transmitting plates;

Fig. 5 is a front and sectional view of an oblong frame for holding a light-diffusing plate;

Fig. 6 is similar to Fig. 4 but shows a larger size rectangular frame;

Fig. 7 is similar to Fig. 5 but shows a larger size oblong shaped frame;

Fig. 8 is a front and cross-sectional view of the large size rectangular frame;

Fig. 9 is a front view and two edge views of a triangular shaped frame.

Figure 1:
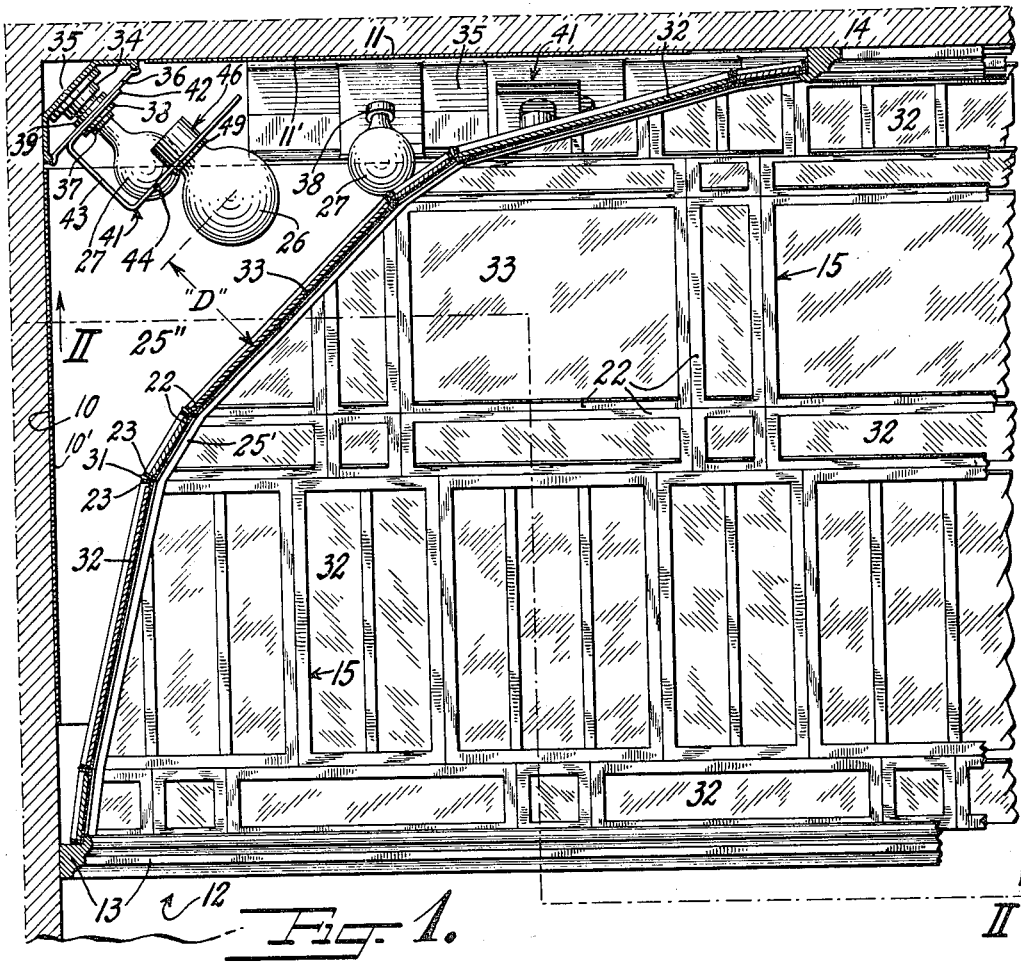

It will, of course, be understood that the shapes of Figs. 4 to 9 inclusive are only illustrative of the almost infinite variety of shapes and sizes which might be employed under my invention.

In the preferred form of my invention, at least one dimension of each style of frame will correspond with a dimension of a different style of frame, to facilitate their fitment together.

Fig. 10 is a fragmentary perspective view of a portion of the corner joint support;

Fig. 11 is a fragmentary perspective view showing portions of the flanges of two frames, secured together;

Fig. 12 is a sectional and end view of a rivet, the preferred means for joining two frames so as to form a part of a single assembly;

Fig. 13 is a fragmentary perspective view showing a wedge piece in position between the flanges of two frames to hold them in riveted angular relation;

Fig. 14 is a perspective view of the wedge-shaped piece employed to separate the frames;

Fig. 15 is a detailed, enlarged view, partly in section, showing the preferred way of mounting the light source employed for providing the diffused general light emission and, in a plane nearer to the beholder, the preferred way of mounting the light source employed for providing a beam of light specifically directed toward some object of vision;

Fig. 16 is a detailed view of a portion of the preferred construction for supporting the light source designed to give parallel, directed beam;

Fig. 17 is a perspective view of an assembly unit applied to the interior of a room; and Fig. 18 is a fragmentary perspective view showing a frame and a companion frame or retainer member for holding a glass flat in position when it is desirable to hold the light transmitting element in a vertical position.

In providing a lighting element of the present character it would ordinarily be necessary to build a unit to fit the particular room in which it is to be installed. Under this condition, considerable expense would be involved, since each structure would necessarily have to be made special in the factory after the necessary measurements had been taken. The labor cost would, therefore, be high and a great deal of trouble and time would be consumed. A structure could, of course, be produced in this manner, but the present invention goes further than that and provides a structure which may be built up of a number of conveniently connectable and interchangeable elements. These elements may be assembled into a complete skeleton frame, for one side of a room and these elements may be easily and quickly united and then trimmed to fit a similar skeleton frame for the adjacent side.

By reason of the selection of the component parts or skeleton units which compose the frame, it is possible, in accordance with the present invention, to lay out and unite the various elements into complete sections and cut or trim the sections to meet the conditions of the particular job. The simplicity of assembly and the flexibility of the present structure to meet varying conditions is shown in the accompanying drawings in which the walls 10 and ceiling 11 of a room 12 are shown. Attached to the wall and ceiling and supported by molding pieces 13 and 14 is a frame or plate-supporting structure 15. This structure is comprised of individual frames 16, 17, 18, 19, 20 and 21 shown in Figs. 4 to 9. Each of the frames is formed with a plate supporting flange 22 and side or connector flanges 23. The connector flanges are provided with perforations 24 to receive rivets or eyelets 25 as shown in Fig. 12.

Figure 3:
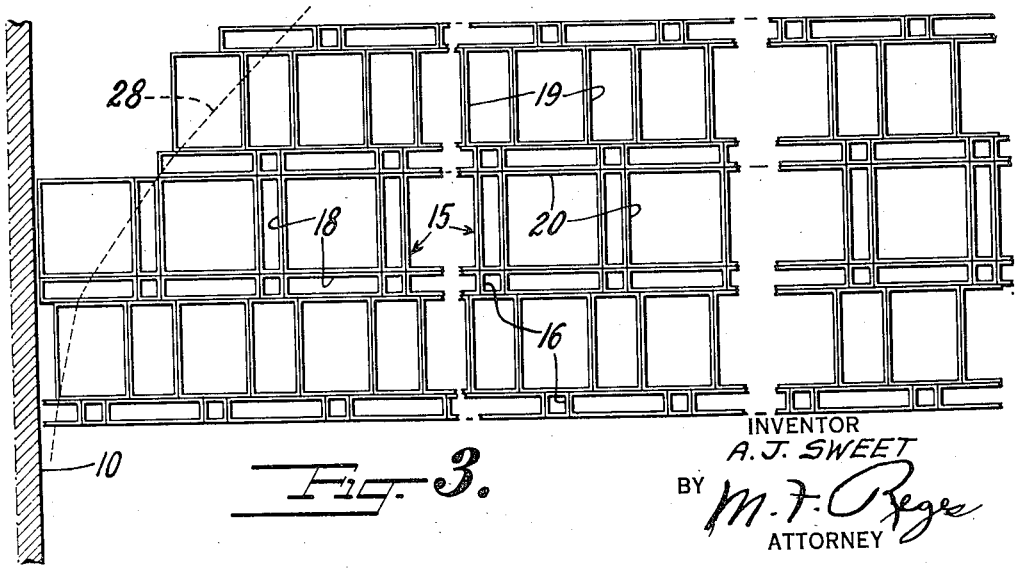
Fig. 3 is an assembly of the skeletal element of one side of the room, duly assembled and laid out in position to be cut for fitting at the corners of the room.

When assembling the structure composed of the numerous frames, the frames may be positioned in lay-out form as shown in Fig. 3 with the different sized plates arranged to give a pleasing selected design in the form of a wall, the walls being connected by an angle or junction piece 25'. If the frame is to be used as a flat or horizontal ceiling fixture, the various component parts may be laid out in accordance with the general shape of the room and may be readily cut to the exact shape by trimming. In the present embodiment of the invention, however, the structure is shown as applied to what may be termed cove lighting wherein the fixture is disposed to give a dome shape to the room and is of an arcuate form in transverse cross section having one edge adjacent to the ceiling and one edge adjacent to the wall of the room leaving a space or compartment 25" between the frame and the corner to receive lighting units which may be in the form of incandescent electric lamps 26 or 27.

As shown in Fig. 3, when a side or section of frames have been assembled they may be trimmed as indicated in dotted lines 28 to provide for joining with another section at 29 as shown in Fig. 17.

For the purpose of obtaining the necessary curvature of the frame to provide for the cove type of structure, wedge shaped members 31 are provided and, as shown in Fig. 13, these wedge shaped members are disposed between the connector flanges 23 of adjacent frames which, when secured by rivets 25, are held in the desired angular relation so that each frame is tilted slightly to complete the curved formation.

When asembling the structure, the flanges 22 face outwardly disposing the connector flanges 23 in the rear thus leaving each individual flange in position to receive a light diffusing plate 32. Inasmuch as the frames are disposed at an angle to the vertical, the plates will remain in position without means other than their weight against the frame. If desirable, however, they may be held in by suitable clips. In practice it has been found that the weight of the plates and the position of the frame serve to hold the plates in the proper positions for all practical purposes. The plates, therefore, are readily removable and one plate may be substituted for another at will.

As illustrated in Fig. 17 of the drawings the light-giving elements are shown positioned behind the plates in the row indicated by the reference numeral 33. For this purpose sockets 34 may be secured to a bracket or wire duct 35 rigidly attached to the wall and ceiling and so positioned as to support the sockets with their longitudinal axes substantially vertical to the plane of the row 33 of plates. Each socket is provided with a reflector 36 which in conjunction with the enclosed surfaces of the wall and ceiling acts to reflect light. The surfaces of the wall and ceiling may, if desirable, be provided with reflecting layers or plates 10' and 11' to provide a more effective reflective medium. Each socket is provided with threads 37 to receive clamp nuts 38 and 39 between which the reflector 36 may be secured. The elements 27 may be employed to direct light through the plates 33 which may be of the ordinary diffracting or light-disbursing crystal glass as hereinafter more fully set forth or may be of opal or other diffusing translucent glass.

When it is desirable, however, to direct a concentrated beam of light onto a given portion of the room, one of the plates may be removed and a prismatic lens substituted. When using such a lens it is desirable to adjust the light source in proper relation to the lens to produce a beam of light properly directed. For this purpose a U-shaped strap or bracket arm 41 is provided having foot piece 42 provided with an aperture to receive the threaded portion 37 of the base. The foot piece may be locked in position by the clamping nuts 38 and 39. Integral with the foot piece 42 is an extension 43 bent at right angles to provide a lamp carrier arm 44 having a slot 45. The arm 44 is provided with a socket 46 disposed in the slot 45 and movable therealong. This socket is provided with the usual internal screw shell 47 and is so disposed that the shell extends through the slot 45 to bring a shoulder 48 on the body of the socket in contact with the arm 44.

A clamp ring 49 is provided of suitable insulative material and internally threaded to be screwed over the shell and press the arm 44 between the ring and the shoulder 48 thus holding the socket in a given position. A swivel joint is thus provided and the socket may readily be adjusted to any position along the arm 44 by loosening the ring 49 and may be clamped in position by tightening the ring. By this construction a bulb 26 may be secured in such relation to a prismatic lens 51 as to direct a concentrated beam of light on a table, desk or other portion of the room.

When it is desirable to practice the present invention to provide a unit having the light-transmitting wall in a substantially vertical plane frames 55 as shown in Fig. 18 may be employed. These frames may be generally the same as shown in Figs. 4 to 7 but may be provided with a retainer member or rim 56 which snugly fits the inner surface of the flange of the frame. Thus when a glass plate 57 is in place the rim 56 may be forced into position locking the plate in the frame. The retainer frames may be provided with depressions 58 to receive the heads of rivets 59 so that the retainer members 56 will be more securely retained.

By reason of the present invention a simple and inexpensive structure is provided since the various component parts may be machine-made in quantity cheapening the cost and at the same time the method of fabrication provides the necessary strength and affords a construction which conforms to the requirements of the laws governing the installation and use of structures of this character.

In the practical application of my invention to problems of lighting service, the architect or other designer will design that element of the interior which is to be made luminous, employing in his design the shapes and dimensions of the standard factory-made parts such as frames 16, 17, 18 and 19 which are typically illustrated in Figs. 4 to 9 inclusive. The vast variety of designs in which these parts can be combined affords a broad freedom to the designer with respect to æsthetic effects. The use of uniform, machine-made parts guarantees to the designer the execution of the design without close attention, on the designer's part, at relatively low cost, without vexatious defects arising from non-uniformity in workmanship.

In erection, the contractor secures the requisite quantity of the various piece parts from the factory or from a local jobber or dealer. With setting punch and soft expanding rivets 25, utilizing the factory-made rivet holes 24, the contractor assembles the standard parts in accordance with the design. At points of juncture typically illustrated by the corners of the room in Figs. 2 and 17, the contractor cuts the assembly to fit the adjoining assembly, joining the two assemblies by a suitable junction piece 25'. For types of junction often met with in practice, standard factory-made junction pieces will be provided; in other cases, junction pieces will be fabricated on or especially for the job.

Where approximations to curved surfaces or changes in slope are required, the wedge-shaped pieces 31, shown in Fig. 14, are inserted between two adjacent frames, as shown in Fig. 13. Such wedge-shaped pieces may be furnished, factory-made in a variety of angles. The construction here shown affords a rigid and permanent attachment and involves great convenience of assembly and low cost.

Except for that special case where the plane of the glazed architectural element is vertical or nearly so, the glass is preferably held in the frame merely by gravity. More significantly expressed, the frame is made of such a shape as to provide a secure support of the glass with gravity as the only holding element. This feature permits of very convenient removal of the glass for cleaning or for access to the lamps or electrical wiring. It is a feature materially promoting the practical utility of the invention.

Where the glazed architectural element occupies a plane vertical or nearly so, the invention includes the use of the companion frame or retainer member 56 snugly fitting within the standard frame 55 in the same manner as the common can of commerce fits into its cover. Since both are machine made, it is practical to provide a snug fit. This method of support, shown in Fig. 18, provides a secure support yet one easily removed for cleaning, or for access to lamps or wiring.

In the simplest form of the invention, the glazed elements will be simple pieces of glass of proper character, cut to fit the respective frames. It is possible, however, to provide leaded-glass assemblies, enlarging the æsthetic possibilities of the design by contrasting the narrower metal band of the leading with the wider metal band of the frames, or by more elaborate designs worked out in contrasting colors or by both.

It is also possible to provide two similar pieces of glass, preferably diffracting glass (pattern or surface-roughed crystal glass), and to assemble these face to face with a design in colored celluloid or colored paper between them. This affords an inexpensive means of providing decorative effects which can conveniently and inexpensively be altered from time to time. The two pieces of glass and the sandwiched color design will usually be assembled into a single unit by a binding around the periphery.

As will be obvious, the tone of the illumination to be provided can be controlled by selection of glass or other light-transmitting material of the proper color. The most general application of this feature will be in installations where it is desired to provide artificial illumination of daylight color value, in which situation blue glass of the proper characteristics will provide such selective absorption as will transform the yellow light of the ordinary incandescent lamp to the white light of ordinary daylight.

By intelligent selection of the architectural elements which are to be made light-emitting, the character of the illumination can be controlled, to the end of attaining desirable utilitarian or hygienic or æsthetic effects. Thus, if the invention be employed to provide a luminous ceiling or parts of ceiling, the resultant illumination will be much stronger on horizontal surfaces than on vertical surfaces. If, on the other hand, the invention be applied to the construction of luminous pilasters or wall surfaces, vertical objects in the room, in planes facing such wall surfaces, will be much more brightly illuminated than horizontal objects or objects turned away from the luminous wall surface.

Still again, where it is desired to illuminate all surfaces in the room, whether vertical or horizontal, to approximately the same intensity, a luminous cove, such as illustrated in Figs. 1 and 17, will produce the desired result. The invention, therefore, provides great latitude of design with respect to the illumination results to be produced.

In many classes of lighting service, it is desirable to provide a general uniform illumination with superimposed brighter lighting of the correct directional value on certain objects in the room. Thus, for example, in ordinary office lighting it is desirable to provide general uniform illumination on vertical and horizontal surfaces with superimposed brighter illumination on the desk, this latter being delivered over the left shoulder of the desk user so that the shadows and any specular reflections will be thrown away from the user's eyes. The invention is adapted to this requirement by substituting an element of lens glass for an element of the diffusing glass chiefly used, selecting such location as will enable the beam to come from the correct direction. In order to produce a substantially parallel beam, the light center must be at the designed focal distance, D of Fig. 1, behind the lens. If the light center is at the focus,—that is, directly behind the optical center of the lens and at the focal distance,—the parallel beam of light will be emitted perpendicular to the surface of the lens. If, however, the focal distance be maintained but the light center be moved laterally away from the focus, the beam will be emitted at a corresponding angular divergence from the perpendicular to the lens.

It is possible, therefore, by such lateral displacement of the light center to vary the direction of the beam so as to produce the exact results desired. It would, of course, be possible to produce the same results by varying the design of the lens. This invention, however, permits a standard form of lens to be used, and the substantially-identical results to be accomplished by lateral displacement of the light center, to the increased practicality and utility of the device.

The preferred means for producing the results described in the preceding paragraph are shown in the upper left hand corner of Fig 1. Here the U-shaped strap 41 is employed for supporting the electrical receptacle and its lamp. This U-shaped strap is attached to the wiring duct or to the building construction by a swivel joint which can be clamped in any desired position. The electrical receptacle is clamped to one arm of the U by such means as permit it to be adjusted at any position along this arm which may be desired. By adjusting the receptacle in such position of the arm of the U as will bring the filament center at the desired lateral displacement from the focus of the lens and by rotating the entire U on the swivel by which it is supported and clamping it when the proper position of rotation is reached, the light beam from the lens may be thrown in exactly the desired direction. If desired for greater efficiency, a hemispherical reflector may be used as an auxiliary to the light source; or, if the glass element be prismatic glass of other than lens form, the reflector employed may be of such design as shall properly coordinate with the optical characteristics of the glass plate.

The light source or sources used in conjunction with lens or prismatic plates to produce approximately parallel light beams may be wired on separate control from the light sources employed for the general, diffused lighting. It is then possible to provide only the general diffused lighting, or only the parallel light beams or the combination of the two. A feature of the invention, including means for conveniently varying the light distribution without change in the architectural effects other than in the luminosity of certain architectural elements, and without other effort than the mere snapping of a wall switch, is of very considerable practical importance.

It will be obvious that if for any reason, such as rearrangement of objects in the room, it be desired to change the location of the object upon which the parallel beam is delivered, the invention provides a means by which this can be inexpensively, conveniently and quickly accomplished. It is necessary only to remove one of the lamps employed for diffuse lighting, attach the U-support to the respective lamp receptacle which then becomes a means for swivel attachment, interchange the wiring connections and interchange the lens and diffusing glass plates. In other words, the complete equipment at the parallel beam outlet is interchanged for the equipment at some other outlet heretofore used for the diffused lighting By such simple change the character of light distribution may be adapted to substantially any conceivable lighting requirement of an interior.

It will be obvious that light sources of a wide diversity of character may be employed. For instance, light sources in which the element of luminosity is an incandescent gas rather than incandescent solid, such as the mercury vapor lamp or the neon lamp, may be employed. Such light sources, if of satisfactory color value, are perfectly adapted to diffused lighting under this invention, though they are not so well adapted as the incandescent lamp to the parallel beam lighting.

It will be equally obvious that this invention is adapted to the inclusion of health radiations as well as visible radiations. For instance, the light source employed may be a source emitting radiation in the so-called "vital ray" band, radiation of wave length between 289 milli-microns and 313 milli-microns. By employing a glass which transmits radiation of this character, the provision for health-giving rays in conjunction with visible light, while yet attaining a highly satisfactory architectural effect, is entirely practical and convenient.

The versatility of the invention with respect to the attainment of the widest diversity of light effects in conjunction with the widest diversity of architectural effects is a most impressive and important feature. It is true that a similar diversity is theoretically obtainable by special construction of similar design built for a specific installation, but the impracticality of such constructions, due alike to cost considerations and to the impracticality of sufficient uniformity in the fabrication of the parts, has debarred the public from securing the advantages of this type of lighting. By providing a construction which removes these practical barriers, a most useful form of lighting is made practical for general use.

What is claimed is:

1. A lighting fixture comprising a plurality of holders for light-transmitting plates each of said holders comprising a frame having a ledge to receive a plate and a surrounding flange, said holders being arranged with their flanges adjacent to constitute a light-transmitting partition, means for connecting the flanges of adjacent holders, means for securing said partition in spaced relation to the wall of a room, a light source disposed between said partition and said wall to provide diffused illumination for said room, said plates being removable to permit the substitution of a plate capable of projecting a concentrated beam of light to a predetermined portion of said room.

2. A light unit comprised of a plurality of holders for light-transmitting plates, said holders being of definite dimensions and varying in shape, each of said holders having a perforated peripheral flange, said perforations being positioned to align the perforations of adjacent flanges when said holders are disposed edge to edge to provide a partition and means disposed in said aligned perforations to secure said holders in rigid relation.

3. In combination with a room, an overhead lighting structure comprising light-transmitting plates, holders for said plates, each of said holders having a ledge to receive a plate and a surrounding flange, said holders being arranged with their flanges adjacent, means between said flanges for holding said plates in angular relation to provide a substantially arcuate shaped partition and means for securing one edge of said partition to the wall of said room and the other edge to the ceiling of said room.

4. In combination with a room, an overhead lighting structure comprising light-transmitting plates, means for holding said plates with their edges adjacent, wedge-shaped members between said edges for holding said plates in angular relation to provide a substantially arcuate shaped partition, means for securing one edge of said partition to the wall of said room and the other edge to the ceiling of said room, and means for supporting a light source in the space between said partition and the wall of said room.

5. In combination with a room, a fabricated portion comprising a multiplicity of holders for light transmitting plates each of said holders consisting of a frame having a ledge to receive a plate and a surrounding flange, said holders being arranged with their flanges adjacent to provide a plate retainer wall, means for connecting the flanges of adjacent holders, and means for securing said wall diagonally between the ceiling and wall of the room whereby a compartment is provided in the upper corner of the room to house a light source.

6. In combination with a room, a fabricated portion comprising a multiplicity of holders for light-transmitting plates each of said holders consisting of a frame having a ledge to receive a plate and surrounding flange, said holders being arranged with their flanges adjacent to provide a plate retainer wall, means for connecting the flanges of adjacent holders, means for securing said wall diagonally between the ceiling and wall of the room whereby a compartment is provided in the upper corner of the room to house a light source and means in said compartment for supporting lamps behind selected plates of said wall abutting edges connected.

7. A lighting partition comprising a partition arranged to bridge the corner of a room between a wall and the ceiling consisting of a plurality of holders for light-transmitting plates said holders having projecting portions, means for securing said portions together with the holders in edge abutting angular relation to constitute an arcuate light-transmitting partition and means for securing one edge of the partition to a wall and an opposite edge to the ceiling of a room.

8. A lighting partition comprising a partition arranged to bridge the corner of a room between a wall and the ceiling consisting of a plurality of holders for light-transmitting plates said holders having projecting portions, means for securing said portions together with the holders in edge abutting angular relation to constitute an arcuate light-transmitting partition and means for securing one edge of the partition to a wall, an opposite edge to the ceiling of a room and a plurality of light-giving elements arranged between said partition and the wall of said room.

9. A lighting fixture comprising a partition extending from a wall of a room inwardly and toward the ceiling, said partition consisting of a multiplicity of frames for light-transmitting plates said frames having flanges at their abutting edges by means of which they are united.

ARTHUR J. SWEET.